US008397265B2

(12) United States Patent
Henocq et al.

(10) Patent No.: US 8,397,265 B2
(45) Date of Patent: Mar. 12, 2013

(54) METHOD AND DEVICE FOR THE CONTINUOUS TRANSMISSION OF A VIDEO IN A COMMUNICATION NETWORK

(75) Inventors: Xavier Henocq, Acigne (FR); Fabrice Le Leannec, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 1186 days.

(21) Appl. No.: 11/008,955

(22) Filed: Dec. 13, 2004

(65) Prior Publication Data

US 2005/0198676 A1 Sep. 8, 2005

(30) Foreign Application Priority Data

Dec. 22, 2003 (FR) ...................................... 03 15166

(51) Int. Cl.
*H04N 7/173* (2006.01)
*H04N 5/14* (2006.01)
*H04N 9/64* (2006.01)
*G06F 15/16* (2006.01)

(52) U.S. Cl. ............... 725/90; 725/86; 725/97; 725/98; 725/116; 725/131; 348/576; 709/203

(58) Field of Classification Search .................... 725/86, 725/97, 98, 93, 90, 116, 131; 348/571, 576; 375/240.01; 382/254; 709/203
See application file for complete search history.

(56) References Cited

U.S. PATENT DOCUMENTS

| | | | | |
|---|---|---|---|---|
| 5,729,471 A * | 3/1998 | Jain et al. | ....................... | 725/131 |
| 5,973,681 A * | 10/1999 | Tanigawa et al. | ............. | 715/716 |
| 6,026,474 A * | 2/2000 | Carter et al. | ................... | 711/202 |
| 6,154,771 A * | 11/2000 | Rangan et al. | ................. | 709/217 |
| 6,215,766 B1 | 4/2001 | Ammar et al. | ................. | 370/229 |
| 6,298,482 B1 * | 10/2001 | Seidman et al. | ............... | 725/101 |
| 6,570,586 B1 * | 5/2003 | Kamen et al. | .................. | 715/719 |
| 7,107,606 B2 * | 9/2006 | Lee | ................................... | 725/87 |
| 7,159,235 B2 * | 1/2007 | Son et al. | .......................... | 725/91 |
| 7,301,944 B1 * | 11/2007 | Redmond | ...................... | 370/390 |
| 7,367,042 B1 * | 4/2008 | Dakss et al. | ..................... | 725/60 |
| 7,440,588 B2 * | 10/2008 | Kaneko et al. | ................. | 382/103 |
| 7,721,307 B2 * | 5/2010 | Hendricks et al. | .............. | 725/34 |
| 7,752,642 B2 * | 7/2010 | Lemmons | ....................... | 725/32 |

(Continued)

FOREIGN PATENT DOCUMENTS

EP 1 320 216 6/2003
WO WO 03/061240 7/2003

OTHER PUBLICATIONS

J. Viron, et al., "TCP-Comparable Rate Control for FGS Layered Multicast Video Transmission Based on a Clustering Algorithm", Proceedings of the IEEE International Symposium on Circuits and Systems, vol. I, 2002, pp. 453-456.

(Continued)

*Primary Examiner* — Pinkal R Chokshi
(74) *Attorney, Agent, or Firm* — Fitzpatrick, Cella, Harper & Scinto

(57) ABSTRACT

The invention relates to a method for the continuous transmission of a video from a server to a number of client machines over a communication network, comprising the following steps:
  obtaining requests from client machines, at least some of the requests obtained each specifying at least one spatial zone of interest in one or more images of the video, a spatial zone representing a set of digital data,
  processing the requests obtained so as to determine one or more intersections defining common data between the spatial zones of interest of the video,
  creating a multipoint network session for each intersection thus determined.

19 Claims, 6 Drawing Sheets

U.S. PATENT DOCUMENTS

| | | | | |
|---|---|---|---|---|
| 7,839,926 | B1 * | 11/2010 | Metzger et al. | 375/240.01 |
| 8,160,312 | B2 * | 4/2012 | Steinberg et al. | 382/118 |
| 2002/0042921 | A1 * | 4/2002 | Ellis | 725/87 |
| 2002/0056122 | A1 * | 5/2002 | Yokoyama et al. | 725/87 |
| 2002/0154892 | A1 * | 10/2002 | Hoshen et al. | 386/87 |
| 2003/0135863 | A1 * | 7/2003 | Van Der Schaar | 725/95 |
| 2003/0174243 | A1 * | 9/2003 | Arbeiter et al. | 348/384.1 |
| 2004/0136598 | A1 | 7/2004 | Le Leannec et al. | 382/232 |
| 2004/0183918 | A1 * | 9/2004 | Squilla et al. | 348/211.2 |
| 2004/0218099 | A1 * | 11/2004 | Washington | 348/571 |
| 2004/0221322 | A1 * | 11/2004 | Shen et al. | 725/135 |
| 2005/0114386 | A1 | 5/2005 | Nassor et al. | 707/102 |
| 2005/0125823 | A1 * | 6/2005 | McCoy et al. | 725/34 |
| 2005/0180646 | A1 | 8/2005 | Denoual et al. | 382/239 |
| 2005/0198676 | A1 * | 9/2005 | Henocq et al. | 725/86 |
| 2006/0288375 | A1 * | 12/2006 | Ortiz et al. | 725/62 |
| 2007/0103387 | A1 * | 5/2007 | Kondo et al. | 345/1.2 |

OTHER PUBLICATIONS

D. Taubman, et al., "Architecture, Philosophy, and Performance of JPIP: Internet Protocol Standard for JPEG2000", Proceedings of the SPIE, SPIE, Bellinghma, VA, US, vol. 5150, No. 1, Jul. 8, 2003, pp. 791-805.

A. Swan, et al., "Layered Transmission and Caching for the Multicast Session Directory Service", Proceedings of the ACM Multimedia 98. MM '98. Bristol, Sep. 12-16, 1998, ACM International Multimedia Conference, New York, NY: ACM, US, vol. Conf. 6, pp. 119-128.

U.S. Appl. No. 11/130,115, filed May 7, 2005.

K. Tanaka, et al., "Adaptive Video Distribution Model of QHD (Quadruple HD) with JPEG2000", Apr. 23-25, 2003.

T. Fukuhara, et al., "Motion JPEG2000 Final Draft International Standard 1.0" ISO/IEC 15444-3 (JPEG2000, Part 3), Mar. 27, 2001.

"ISO/IEC 14496-10, ITU-T Rec.H.264, Joint Video Specification, Oct. 2002".

R. Prandolini, et al., "Information Technology—JPEG 2000 image coding system—Part 9: Interactivity tools, APIs and protocols". Final Committee Draft. ISO/IEC JTC1/SC29 WG1 N3052, Jul. 2003.

"Information technology—Coding of audio-visual objects—Part 1: Systems", (ISO/IEC 14496-1), Dec. 1998.

* cited by examiner

METHOD AND DEVICE FOR THE CONTINUOUS TRANSMISSION OF A VIDEO IN A COMMUNICATION NETWORK

BACKGROUND OF THE INVENTION

1. Field of the Invention

The invention relates to a method and a device for the continuous transmission of a video from a server to a number of client machines over a communication network.

2. Related Art in the Invention

It is known to transmit videos over a communication network, such as the Internet for example.

However, the implementation of such a transmission remains difficult since this type of network has been designed more for the transmission of files than for the transmission of continuous data at a high rate.

The difficulty increases when it is a question of transmitting a video from a server to a number of client machines, the characteristics of which are heterogeneous.

This is because in this case it is necessary to satisfy a number of users of client machines that are connected to the server and have different bandwidths and thus individual computing and display capabilities.

A system for the transmission of videos over a communication network is known from the article entitled "*Adaptive Video Distribution Model of QHD (Quadruple HD) with JPEG2000*".

In the said system, a server transmits a video in the Motion JPEG2000 format to a number of users who each receive the same amount of data and who may locally manipulate the data that constitute the said video, depending on their own requirements.

However, this method is not satisfactory in that the transmission of a single version of the video at a fixed rate will not satisfy all users.

This is because some users will receive too high a rate, thus causing a loss of data, while others will not receive enough data in relation to their available bandwidth.

Another transmission system is known from the article entitled "*TCP-compatible rate control for FGS layered multicast video transmission based on a clustering algorithm*".

Such a system provides for the transmission of videos in the MPEG-4 format over a multipoint network between a server and a number of users who have heterogeneous bandwidths.

Each user who wishes to receive the video transmits a packet to the server to inform the latter of the maximum bandwidth it can receive.

The various packets from the various users are gathered together in the nodes of the network so as to then transmit to the server just one packet containing the information relating to all the users.

For its part, the server then forms groups of users as a function of the rate constraints specific to the latter and creates, from the video to be transmitted, as many "scalability" levels (hierarchical levels), in terms of time or quality, as there are groups of users formed.

Each scalability level is then transmitted over a multipoint address of the network.

The users then subscribe to a number of scalability levels compatible with their rate constraints and thus each receive a rate that is compatible with their bandwidth constraint.

Taking the techniques proposed in the prior art and briefly described above into account, the Applicant noticed that it would be beneficial to further improve the performance of the existing systems for the transmission of videos over communication networks by further reducing the amount of data transmitted over the network and, where appropriate, by increasing the capacity of the server to meet the clients' wishes as precisely as possible.

SUMMARY OF THE INVENTION

In this respect, the object of the present invention is a method for the continuous transmission of a video from a server to a number of client machines over a communication network, comprising:

obtaining requests from client machines, at least some of the requests obtained each specifying at least one spatial zone of interest in one or more images of the video, a spatial zone representing a set of digital data, processing the requests obtained so as to determine one or more intersections defining common data between the spatial zones of interest of the video, creating a multipoint network session for each intersection thus determined.

Correspondingly, the invention also relates to a device for the continuous transmission of a video from a server to a number of client machines over a communication network, the device comprising:

means for obtaining requests from client machines, at least some of the requests obtained each specifying at least one spatial zone of interest in one or more images of the video, a spatial zone representing a set of digital data, means for processing the requests obtained so as to determine one or more intersections defining common data between the spatial zones of interest of the video, means for creating a multipoint network session for each intersection thus determined.

The invention thus makes it possible to organize in a manner that is even more efficient than before the processing of requests from the client machines by determining the data coming from spatial zones specified by the users and common to at least two of them, so as to avoid multiple transmissions of identical data.

Such a processing makes it possible to reduce the number of multipoint network sessions on the network compared to the number of requests from the client machines.

According to one feature, the method further comprises a step of point-to-point transmission over the network, from the server, of a description of the content of each multipoint network session designed to inform each client machine.

Thus, the client machines that have sent requests are informed of the manner in which the various multipoint network sessions are organized by the server.

According to one feature, the method further comprises a step of obtaining a request to subscribe one of the client machines to a subset or to the entire set of the multipoint sessions created by the server, this subset or entire set being designed to transport the data that meet the initial request from the client machine, said subscription request being transmitted by said client machine after the latter has consulted the description of the content of at least one multipoint network session.

When a user has consulted the description of the content of one or more multipoint network sessions, he is then capable, if he so wishes, of setting up a new request so as to receive the data designed to be transported via the session or sessions by using, for example, the IGMP protocol.

According to another feature, the method further comprises a step of transmitting to the client machine in question data transported by the subset or entire set of multipoint network sessions.

Furthermore, according to another feature, the method further comprises a step of creating at least one multipoint or point-to-point network session for the data that are not contained in the intersections determined.

Here again, the server does not retransmit all the data specified in the request from the client machine, but only those which are specific to it and which have not already been transmitted by a multipoint network session that has already been created.

According to one feature, the method further comprises a step of transmitting to the client machines in question data that are not contained in the intersections determined.

The invention also relates to a communication apparatus comprising a device as briefly described above.

According to another aspect, the invention also relates to:
an information storage means which can be read by a computer or microprocessor, comprising code instructions for a computer program for executing the steps of the method according to the invention as briefly described above, and
an information storage means which can be partially or completely removed and can be read by a computer or microprocessor, comprising code instructions for a computer program for executing the steps of the method according to the invention as briefly described above.

According to yet another aspect, the invention relates to a computer program that can be loaded onto a programmable apparatus, comprising sequences of instructions or portions of software code for implementing the steps of the method according to the invention as briefly described above, when said computer program is loaded onto and run on the programmable apparatus.

Since the characteristics and advantages relating to the device according to the invention, the communication apparatus comprising such a device, the information storage means and the computer program are the same as those mentioned above in relation to the method according to the invention, they will not be mentioned again here.

BRIEF DESCRIPTION OF THE DRAWINGS

Other characteristics and advantages will emerge from the following description, given solely by way of non-limiting example and with reference to the appended drawings, in which.

DETAILED DESCRIPTION OF THE INVENTION

Figure 1:
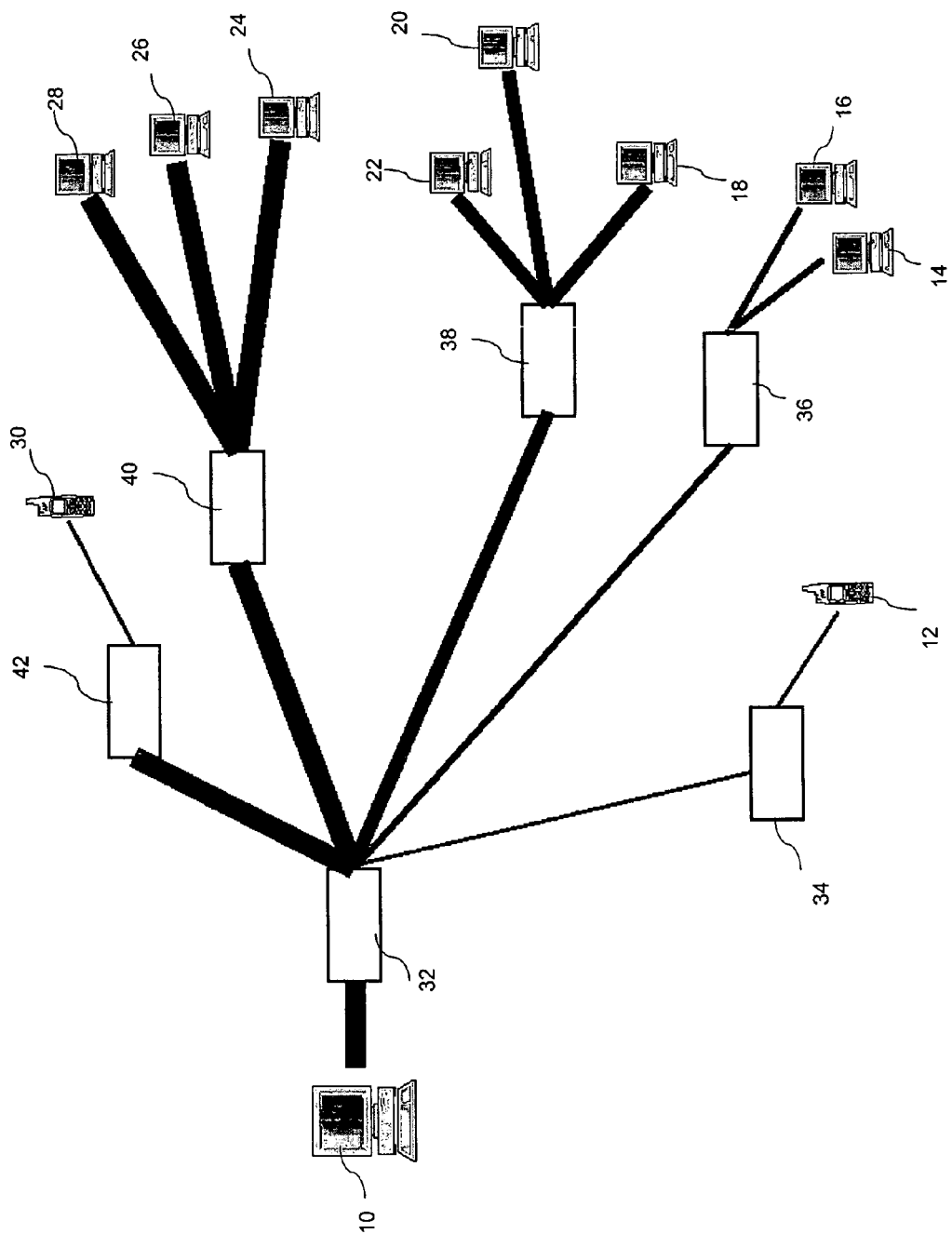
FIG. 1 schematically shows an architecture of the client-server type in a communication network according to the invention.

In the description of an example of an embodiment of the invention which will be given below, it is considered that a server is continuously broadcasting a video over a communication network as shown in FIG. 1. This video is encoded in real time in the format of the MJPEG2000 standard at 30 images/s in the server 10.

This video may, for example, correspond to a television program broadcast over the Internet.

It will be noted that, unlike a video-on-demand application, the users of various client machines 12, 14, 16, 18, 20, 22, 24, 26, 28, 30 have no influence on the temporal progress of the video which is broadcast irrespective of the user interventions.

The users have a graphic interface that makes it possible to request the obtaining of the video and will also make it possible, during the video session connecting the user or users to the server, to modify the display parameters.

The presence of a number of multipoint routers 32, 34, 36, 38, 40, 42 can be seen in the multipoint network of FIG. 1.

In a multipoint communication network, a transmitter does not transmit its data to a receiver, as is conventional in point-to-point networks, but rather to a multipoint address to which a user wishing to receive the transmitted data must subscribe.

If no user subscribes, no data will pass over the network, and if a single user connects then the network load will be equivalent to that of a point-to-point network.

The benefit of a multipoint network comes into play when a number of users subscribe to one and the same address since in this case, unlike in a point-to-point network, the data are transmitted just once to a multipoint router which can duplicate the data if necessary.

By contrast, in a point-to-point network the transmitter must transmit the data stream to a point-to-point router as many times as there are clients making requests.

Consequently, the multipoint router makes it possible to reduce the amount of data passing between the transmitter and the router.

Finally, it may be noted that the IGMP protocol ("Internet Group Management Protocol") has been defined to manage the requests to subscribe to/unsubscribe from a multipoint address.

The video compression standard Motion JPEG2000 (MJPEG2000) corresponds to part 3 of the standard JPEG2000 (*Motion JPEG2000 final draft international standard* 1.0, *ISO/IEC* 15444-3 (*JPEG2000, Part* 3)), the specifications of which indicate that an MJPEG2000 sequence is made up of a number of parts.

The first part, called the "Movie box", contains descriptive data ("Meta-data") that describe the codestream. This includes in particular a description of each media (audio, video, etc.), a description of the tools allowing the media to be read, information allowing access to a sample such as an image, etc.

The second part of an MJPEG2000 sequence contains the useful data, such as the video or audio data of the codestream.

These two parts may be contained in one and the same file (in this case the useful data are inserted into a media data box) or in separate files, and in this case the first part, movie box, contains the URL of the useful data file.

The second file may consist of a sequence of JPEG2000 images or may be in the form of any other file containing JPEG2000 images, such as a file in accordance with the MPEG-4 standard defined in the document *ISO/IEC JTC 1/SC 29/WG* 11, *Information technology-Coding of audio-visual objects, Part* 1: *Systems* (*ISO/IEC* 14496-1), December 1998.

In the example of an embodiment, it is considered that the useful data file contains only one sequence of JPEG2000 images.

The major benefit of the MJPEG2000 standard lies in the new functionalities that it offers compared to equivalent standards such as Motion JPEG.

By virtue of the organization of the codestream of a JPEG2000 image and the intrinsic properties of its compression algorithm based on a decomposition into wavelets, it is easily possible to vary the resolution, the quality and the points of view. It is also possible to vary the image rate.

It will moreover be noted that, unlike the compression standards which use temporal prediction such as H264 (*ISO/IEC 14496-10, ITU-T Rec.H.264, Joint video Specification*, October 2002), there is no dependency between the images.

These multiple views of one and the same image will subsequently make it possible for the user to finely adjust his video to meet his constraints and his wishes.

Structure of the JPEG2000 Codestream

In the JPEG2000 standard, a file is made up of an optional JPEG2000 preamble and of a codestream that comprises a main header and at least one tile. A tile represents, in compressed fashion, a rectangular part of the original image in question. Each tile is formed of a tile-part header and of a set of compressed image data ("tile-part bitstream") which comprises a sequence of packets.

Each packet contains a header and a body containing at least one code block that is a compressed representation of an elementary rectangular part of an image that may optionally have been transformed into frequency sub-bands.

The header of each packet on the one hand summarizes the list of blocks contained in the body in question and on the other hand contains compression parameters specific to each of said blocks.

Each block is compressed over a number of incremental quality levels: a basic layer and refining layers. Each quality level or layer of a block is contained in a distinct packet.

A packet of a set of compressed image data ("tile-part bitstream") of a JPEG2000 file therefore contains a set of code blocks, corresponding to a tile, a component, a resolution level, a quality level and a spatial position ("precinct").

It will be noted that the portion of codestream corresponding to a tile may be divided into several contiguous segments known as tile-parts. In other words, a tile contains at least one segment which contains a tile-part header and a sequence of packets. The division into segments therefore obligatorily takes place at packet boundaries.

In Part 9 of the standard *JPEG2000 image coding system—Part 9: Interactivity tools, APIs and protocols—Final Committee Draft. ISO/IEC JTC1/SC29 WG1 N3052*, R. Prandolini, S. Houchin, G. Colyer, 25 Jul. 2003, new functionalities are added that are designed for the remote manipulation of the images in accordance with the standard over a network. This part, known under the name JPIP (JPEG2000 on IP), defines requests (known as JPIP requests) that allow remote computers to exchange parts or all of a JPEG2000 image. The JPIP requests make it possible, in the context of the invention, to request a video and to change its display quality.

The following two paragraphs describe the formats of the data exchanged by the JPIP protocol.

JPIP return data (*Annex A of JPEG2000 image coding system—Part 9: Interactivity tools, APIs and protocols—Final Committee Draft. ISO/IEC JTC1/SC29 WG1 N3052*, R. Prandolini, S. Houchin, G. Colyer, 25 Jul. 2003).

The JPIP protocol makes it possible to transfer JPEG2000 file portions and five classes of main transfer units are provided for the future JPIP standard:

Meta data-bin: a meta data-bin consists of a sequence of consecutive bytes of the codestream which contribute to a given set of meta-information relating to the compressed JPEG2000 image.

Main header data-bin: a main header data-bin consists of a sequence of successive bytes of the initial JPEG2000 codestream which contribute to the main header of the JPEG2000 file.

Tile header data-bin: the term tile header data-bin refers to a part of the header of the first tile-part header of a given tile; a tile-header data-bin consists of a sequence of successive bytes of the initial JPEG2000 codestream which contribute to a tile-part header of the original JPEG2000 image.

Precinct data-bin: in JPIP terminology, a precinct consists of all of the packets of the various quality layers of the image which correspond to one and the same spatial position; a precinct data-bin denotes a sequence of consecutive bytes which contribute to a given precinct; the term byte-range of a given precinct is also known.

Tile data-bin: a tile-part data-bin consists of a sequence of consecutive bytes or byte-range which contributes to one and the same tile-part.

Each class has a unique identifier, also referred to as the Class-ID.

A JPIP response consists of a header in accordance with the http protocol version 1.1, followed by a sequence of JPIP messages or data-bins. Each JPIP message consists of a header and a body, the header of a message containing the following fields Bin-Id[, Csn], Msg-Offset, Msg-Length [, Aux].

The purpose of the fields Bin-Id and [, Csn] is to uniquely identify the data-bin in question, and they transport the following three items of information:

the index of the codestream to which the data-bin belongs, in the case where the initial JPEG2000 file contains a number of codestreams;

the identifier of the class (Class-Id) of the data-bin in question;

the identifier of the data-bin within the class to which it belongs (the term In-Class-Id is also used).

The fields Msg-Offset and Msg-Length which follow in the header of the message indicate the bytes transported by the useful data contained in the JPIP message. The data-bin identified by the start of the header corresponds to a data segment contained in the initial JPEG2000 file.

The field Msg-Offset indicates the position of the first byte of the useful data of the data-bin in this data segment.

The field Msg-Length indicates the number of useful data bytes contained in the data-bin and extracted from the above-mentioned data segment from the position Msg-Offset.

Finally, the body of each message consists of a portion of Msg-Length bytes of useful data transported by the data-bin. This portion of data is extracted from the original JPEG2000 codestream and corresponds to the byte-range (Msg-Offset, Msg-length) specified in the header of the message.

JPIP requests (*Annex C of JPEG2000 image coding system—Part 9: Interactivity tools, APIs and protocols—Final Committee Draft. ISO/IEC JTC1/SC29 WG1 N3052*, R. Prandolini, S. Houchin, G. Colyer, 25 Jul. 2003).

The image data requests, according to the JPIP protocol, consist of ten types of field:

fields relating to the request transmitted, indicating the type of JPIP command, the name of the image requested, the image identifier, the request identifier and the priority level of the request;

fields for managing network sessions;

display window fields indicating to the server the current zone of interest desired by the client; these fields include in particular the image resolution level associated with the zone, the position of the window in the image, the size of the window (height and width), the image components included in the zone of interest; moreover, the future JPIP standard provides a number of optional parameters, useful for checking the quantity of data contained in the response from the server; these parameters may limit the maximum number of bytes of useful data to return for the zone in question, the maximum number of quality layers to return or even the image quality factor to be satisfied for the zone of interest;

meta-data fields;

fields making it possible to specify limits for the response to a request (size, rate, etc.);

fields specifying what the reactions of the server must be to a request (for example, the server must process all requests preceding the current request or else the current request will cancel all the preceding requests);

fields allowing the requesting of portions of documents in the XML format;

fields relating to the client's cache and providing the server with information relating to the cache of the client sending the request;

fields making it possible to send data to a server;

fields indicating the client's capacities.

Once formed, the JPIP request is encapsulated in a request in accordance with the http protocol version 1.1.

Figure 2:
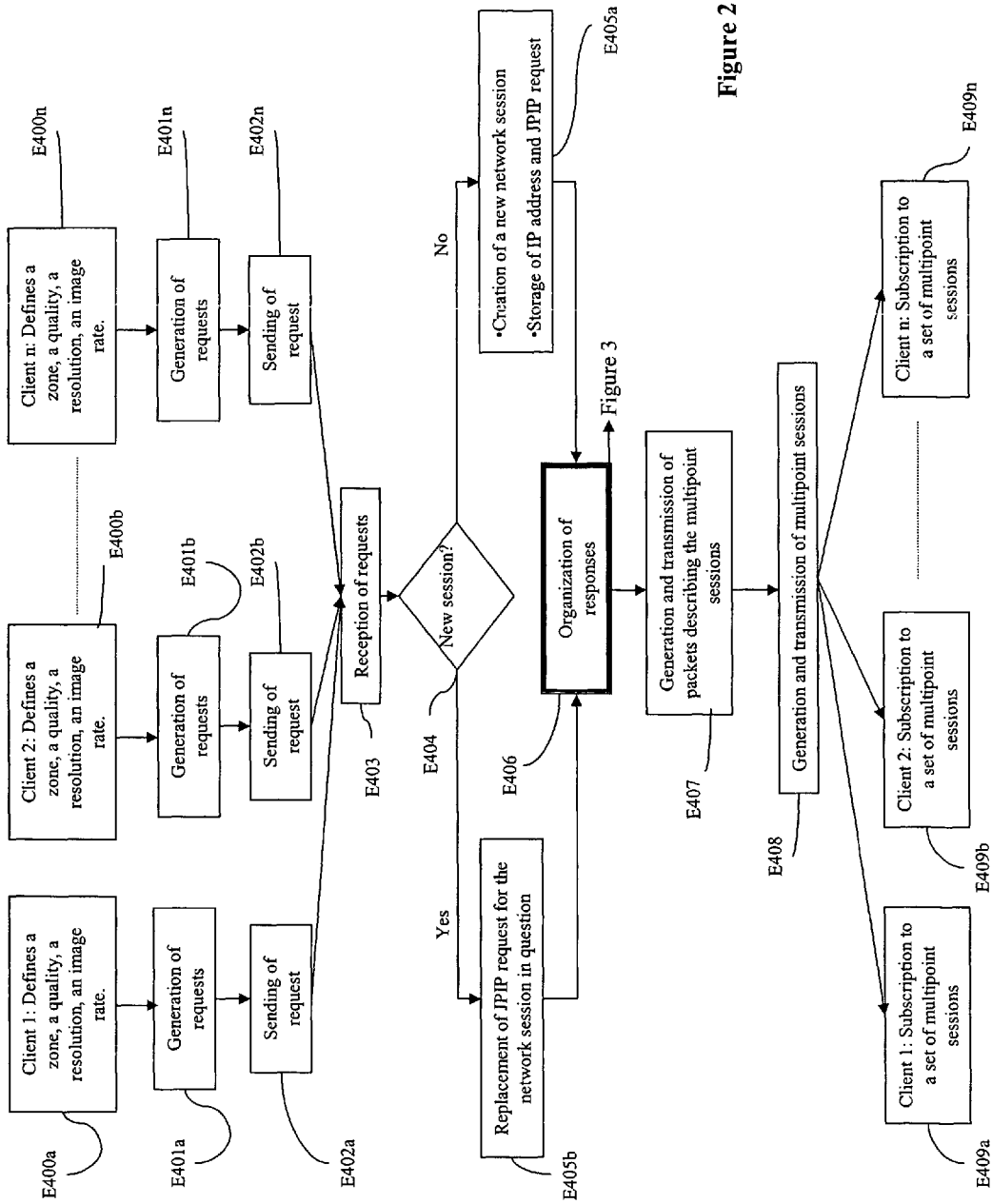
FIG. 2 shows an algorithm for the exchange of information between the server and the client machines of FIG. 1.

FIG. 2 shows an algorithm for the processing of requests coming from various client machines 1, 2, . . . , n, corresponding for example to client machines 12 to 30 in FIG. 1, by the server 10.

Figure 3:
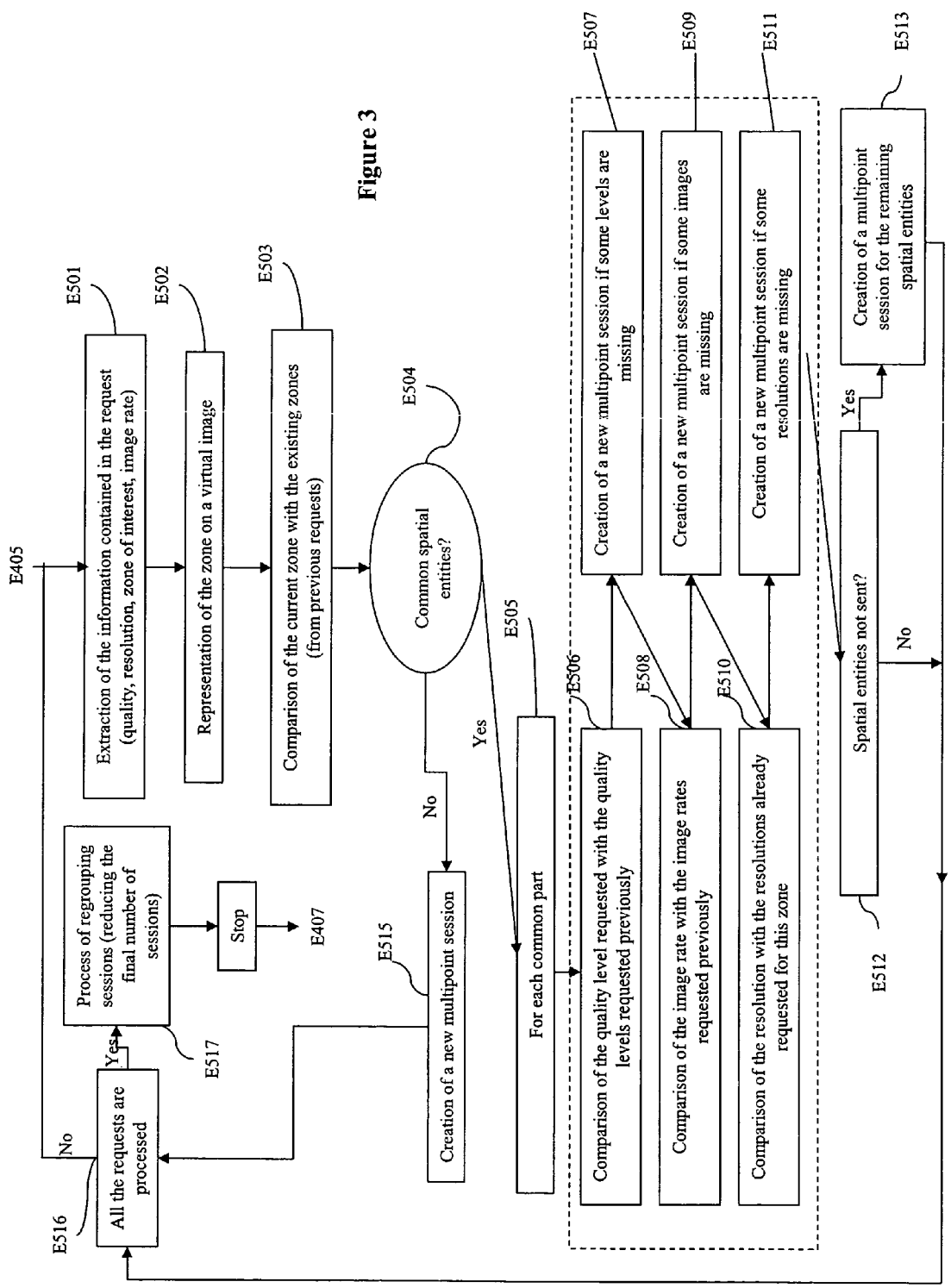
FIG. 3 is an algorithm describing in more detail the steps carried out during execution of step E406 of FIG. 2.
Figure 4:
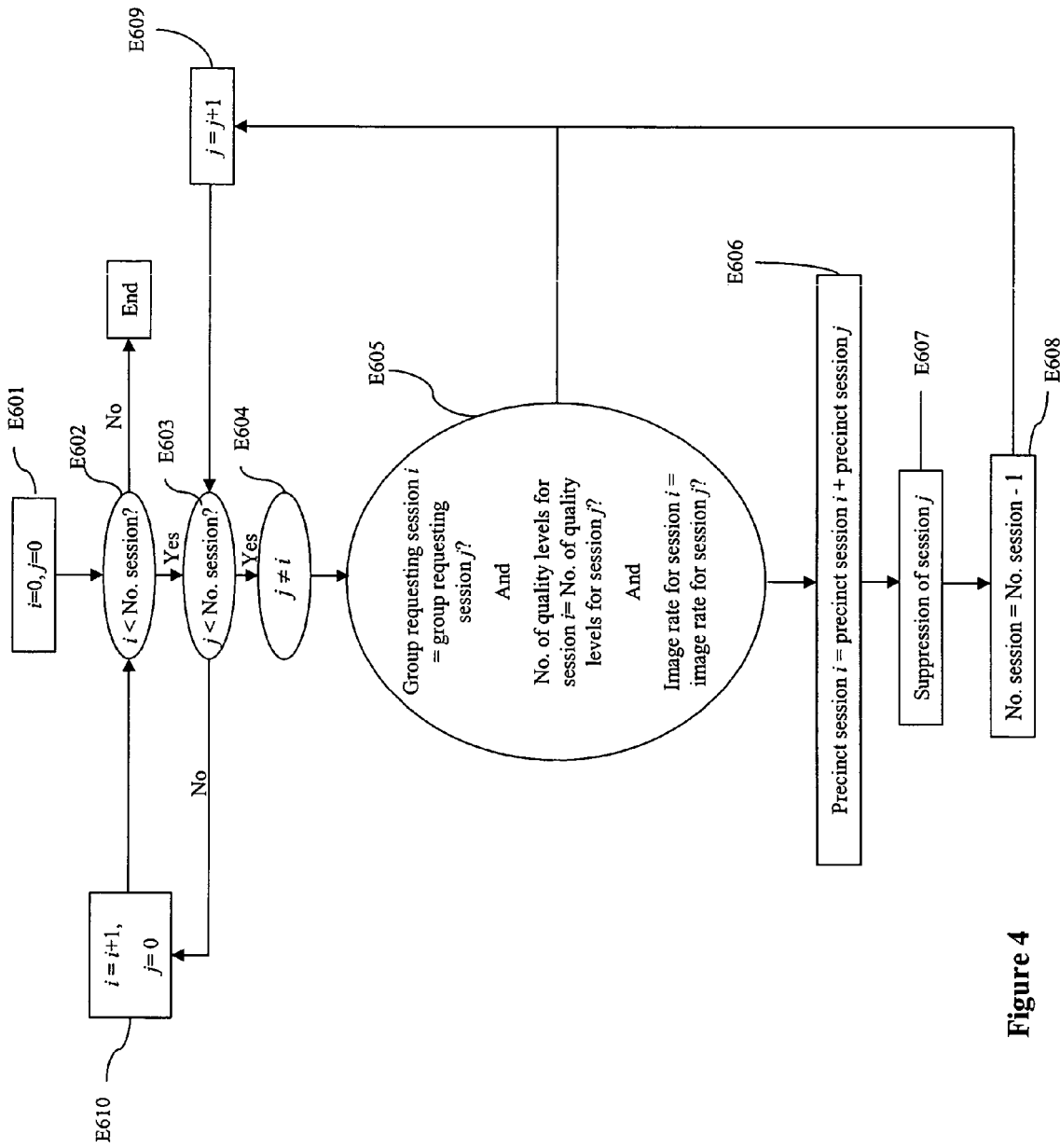
FIG. 4 is an algorithm showing in more detail the steps carried out during execution of step E517 of FIG. 3.

Certain aspects of the processing of the requests by the server are also shown in detail by the algorithms in FIGS. 3 and 4.

During each of the steps E400a, E400b, . . . , E400n, for the first request, each client merely specifies the size of its display window. An implementation algorithm for a JPIP client then formats a request that is compatible with the standard in the corresponding next step E402.

With reference to Annex C of the JPIP standard (*JPEG*2000 *image coding system—Part 9: Interactivity tools, APIs and protocols—Final Committee Draft. ISO/IEC JTC*1/ *SC*29 *WG*1 *N*3052, R. Prandolini, S. Houchin, G. Colyer, 25 Jul. 2003), the JPIP client formats the request while including therein the field target containing the address of the MJPEG2000 video.

This field is followed by the field new channel which indicates that a new JPIP session must be created.

The client then indicates the size of the client's display window by means of the field frame size.

This field is followed by a field client capability, by means of which the client indicates the maximum rate at which it would like to receive the video.

It is assumed here that the client knows the bandwidth that it has available, or at least that it is capable of estimating it at any given moment.

Finally, the client inserts a field codestream in which the value now will be given to the subfield now-range, so as to start the sending of the images starting from the image taken at the moment the request was received by the server.

One example of a request to start the video session may thus take the following form:
GET
http://get.jpeg.org?target=/video/
video.mj2&cnew&fsiz=640,
480&cap=mbw=384K&stream=now
HTTP/1.1
CRLF Once formatted, the JPIP request is encapsulated in an http request which is itself encapsulated in one (or more) packet(s) of the transport protocol in step E402a, E402b, . . . , E402n depending on the client machine in question. The transport protocol used is, for example, the TCP/IP protocol.

During this encapsulation, the transport protocol inserts the IP address of the sender of the request into each packet, and this address will make it possible for the server to identify the various clients.

It will be noted that the requests sent by the clients in no way need to be sent in a synchronized manner.

Once formatted and encapsulated, the first request is sent to the server in step E402a in respect of client 1, E402b in respect of client 2, . . . , E402n in respect of client n.

When the JPIP request sent by the client is not the first request, its formatting differs from that described above but the encapsulation process nevertheless remains the same.

Each client 1, 2, . . . , n may intervene on the video received during the video session and, by means of its graphic interface, may specify a resolution, an image rate and a spatial zone of interest for one or more images of the video that the client wishes to display in the corresponding step E401a, E401b, . . . , E401n.

Each spatial zone specified by the client represents a set of digital data contained in the abovementioned image or images.

Still with reference to Annex C of the JPIP standard mentioned above, in the corresponding step E402 the JPIP client formats the request while including therein the field target containing the address of the MJPEG2000 video. This field is followed by the field channel id identifying the JPIP session of the client, and the latter then indicates the size of its display window by means of the field frame size.

If the client wishes to display a particular zone, he inserts the fields Offset identifying the point at the top left of the zone to be displayed and Region Size indicating the size of the region that is to be displayed.

If the client wishes to vary the image rate, he uses the field sampling rate in which it indicates the image rate that he would like to obtain. It will be noted however that the standard offers another method for varying the image rate, said method consisting in using the field delivery rate. This field is followed by a field client capability, by means of which the client indicates the maximum rate at which he wishes to receive the video.

Finally, if all the fields proposed in the standard are used, the client may specify other fields in the request. It will be noted that if the client wishes to modify the display of his video at any time, the field wait will have to be at no, thus indicating that the response to a request may be stopped by the arrival of a new request.

One example of a JPIP request during a video session may thus take the following form:
GET
http://get.jpeg.org?target=/video/
video.mj2&cid=10&fsiz=640,480&roff=13,13&rsiz=300, 200&srate=15&cap=mbw=384K

HTTP/1.1
CRLF

Once formatted and encapsulated as described above, the request is sent to the server.

It will be assumed that the server regularly checks for the arrival of new requests on its network port.

As soon as a new request is received from a client in step E403, the server checks whether the client is known in step E404. To do this, the server searches for the field cnew in the request indicating the request to open a new network session.

If this field is found, in step E405a the server creates a new network session for this new client and stores its IP address and the contents of the request in memory. By creating a new session, the server creates a session identifier for this new client and this information will also be stored in memory in the server.

If, on the other hand, the field cnew is absent, the server searches for the session number inscribed in the request.

In step E405b, the server then replaces the preceding JPIP request stored in memory with this session by the new request.

Steps E405a and E405b are immediately followed by step E406 which organizes the responses to the requests.

Step E406 is more particularly described with reference to the algorithm of FIG. 3 which forms an integral part of the algorithm of FIG. 2.

During step E406, all the requests present in a memory of the server will be processed as illustrated in FIG. 3.

The algorithm comprises a first step E501 of extraction of the information contained in a request known as a current request. At the end of this step the server knows the spatial zone or zones of interest specified in this request, its resolution and the image rate at which the video must be played.

The server may deduce, by virtue of the maximum rate indicated in the field capacity and the image rate, the mean rate with which an image of the video sequence must comply. This latter information will make it possible to deduce the number of quality levels to be sent for this zone. It is assumed here that, for a given request, the number of quality levels induced by the request will be stable from one image to another.

Step E501 is then followed by step E502, during which the server represents, on a virtual image that it stores in a memory, the image zone covered by the current request.

This zone may not be exactly the zone requested by the client machine.

This is because the server may be forced to enlarge the zone requested so as to include the boundaries of "precincts" (a precinct is a set of code blocks having the same spatial location in the frequency sub-bands of the transformed image).

Step E502 is followed by step E503, during which the server compares the current zone (requested zone or enlarged zone) with the other zones already represented in the virtual image and coming from preceding requests. This process consists of verifying that no point of the existing zones has both an abscissa between the abscissa of the top-left point and that of the bottom-right point of the current zone and an ordinate between the ordinate of the top-left point and that of the bottom-right point of the current zone.

Step E503 is followed by step E504, during which it is determined whether the current zone has one or more common parts (intersections) with existing spatial zones of interest to other requests.

If no common part is detected, step E504 is followed by step E515, during which a multipoint or point-to-point network session is created.

Step E515 is then followed by step E516, during which it is verified that all the requests have indeed been processed.

If so, step E516 is followed by step E517, which will be described below with reference to FIG. 4.

If not, the procedure returns to step E501 (already described) in order to process a new request.

Returning to step E504, if one or more intersections have been determined (the requested or enlarged zone may, for example, be found entirely within a larger zone of one or more other requests, or indeed only some of the data of the requested or enlarged zone may be found in one or more other requests), step E504 is followed by step E505, which successively carries out the following steps E506 to E511 on all the intersections.

This is in some way a sorting of the common parts and other parts.

During step E506, the number of quality levels requested in the current request is compared with the number of quality levels already requested in one or more other requests for this same intersection.

This step is followed by step E507, during which a new multipoint session is created if some quality levels are missing.

It is also possible to create a new multipoint session by subdividing an existing session. This is the case if all the levels requested in the current request are already being transmitted by existing multipoint sessions and if no existing multipoint session, nor any combination of existing sessions, allows this request to be met precisely. For example, if the current request specifies the first three quality levels and if the existing sessions are transmitting the two first quality levels over a first session and the next two quality levels over a second session, the current request cannot be met precisely, even though all the necessary data are already being transmitted. It will then be necessary to subdivide the second multipoint session into two sessions, so as to transmit the latter two quality levels over two separate multipoint sessions.

Step E507 is followed by step E508, during which the image rate requested by the current request is compared with the image rates already requested in other requests for the intersection in question. It is assumed here that, for example, only four different image rates can be requested: 30 images/s (corresponding to the rate of the original sequence), 15 images/s, 5 images/s and 1 image/s.

The original sequence is divided into a succession of groups of thirty images.

When a rate of 30 im/s is requested, all the images of each group will be transmitted.

When a rate of 15 im/s is requested, one image in two will be sent, starting with the first image of a group of thirty images.

When a rate of 5 im/s is requested, one image in five will be sent, starting with the first image of a group of thirty images.

Finally, when a rate of 1 im/s is requested, the first image of a group of thirty images will be sent.

Such an organization ensures that two clients requesting the same image rate will receive the same images.

If images are missing (that is to say they have not already been requested in a request) or if no combination of multipoint sessions makes it possible to meet the current request, either a session is created for the missing images or existing sessions are subdivided in step E509.

Step E509 is then followed by step E510, during which the resolution requested by the current request is compared with the resolutions already requested.

If no combination of existing sessions makes it possible to meet the current request, a new multipoint session is created or existing sessions are subdivided (step E511).

As soon as all the intersections have been looked at and processed, step E511 is followed by step E512, during which it is verified that there are no zones of the images which would not have been represented in the intersections.

If such zones that are not contained in the intersections are identified, a new multipoint or point-to-point session is then created in step E513 in order to send them subsequently.

If not, the procedure moves directly to step E516 described above.

Returning to step E516, when all the requests have been processed, step E517 then tries to reduce the number of multipoint sessions which have been created. It may happen that some multipoint sessions corresponding to different spatial zones may in fact be required by one and the same group of users.

In this case, the server may combine these sessions into a single session for the sake of rationalization.

It will be noted that step E517 is optional.

The process implemented in this step is shown in more detail in the algorithm of FIG. 4, which forms an integral part of the algorithm of FIG. 3.

The algorithm starts at step E601 by initializing the variables i and j to 0.

These two variables are designed to count the multipoint sessions and each represent two multipoint sessions from among the set of multipoint sessions created by the server.

Step E601 is followed by step E602, during which it is verified that all the multipoint sessions have been tested.

If so, the process is terminated.

If not, it passes to step E603, during which it is verified that the variable j has not reached the value of the number of multipoint sessions No. session.

If this value No. session has been reached, the procedure passes to step E610 which increments the value of i by one unit and assigns the value 0 to j.

If not, step E603 is followed by step E604, during which it is ensured that only the sessions that are distinct from one another are considered (i=j is excluded).

During the next step E605, it is verified that the group requesting the multipoint session i is identical to the group requesting the session j.

If this is the case, it is verified that the number of quality levels for the sessions i and j are identical.

If this is the case, it is verified that the image rates for the sessions i and j are identical.

If the answer to one of these questions is no, the procedure passes to step E609, which increments the value of j by one unit.

If not, step E605 is followed by step E606, during which the precincts transmitted in the two sessions i and j are regrouped.

Step E606 is then followed by step E607, during which the multipoint session j is suppressed from the list of sessions.

This step is followed by step E608, during which the number of multipoint sessions is decremented by one unit, and the procedure then passes to step E609 which has already been described.

The process of FIG. 4 ends when all the sessions have been processed.

Returning to FIG. 2, during step E407 which follows step E406 in which the responses are organized by the server, the latter informs each client of the content of each multipoint network session (content description). Beforehand, the server will have defined a different multipoint address for each multipoint network session.

More particularly, in step E407 the server inserts this information, as well as a description of each network session created, into a text or XML file which is then transmitted in succession to each client (identified by its IP address) in a TCP/IP packet.

However, before sending it to a given client, the server inserts into this file the identifier of the JPIP session that it has assigned to this client.

Among the sessions created by the server, those created in steps E513 and E515 mentioned above, which may be of the multipoint or point-to-point type, will be noted.

It will also be noted that, for the sake of simplification, each client machine that has sent a request receives the same content description for all the sessions created by the server.

Step E407 is followed by step E408, during which the server transmits each multipoint network session to the multipoint addresses defined in the preceding step.

The server also transmits the point-to-point network sessions, if there are any.

As soon as the packet or packets describing the network session or sessions have been received, each client may subscribe to the multipoint sessions corresponding to its initial request.

More particularly, the client 1, 2, . . . , n in question transmits to the server a request to subscribe to a subset or to the entire set of multipoint sessions created by the server (in the respective steps E409$a$, E409$b$, . . . , E409$n$).

The subset or entire set of sessions is designed to transport the image data that meets the request initially transmitted to the server.

Figure 5:
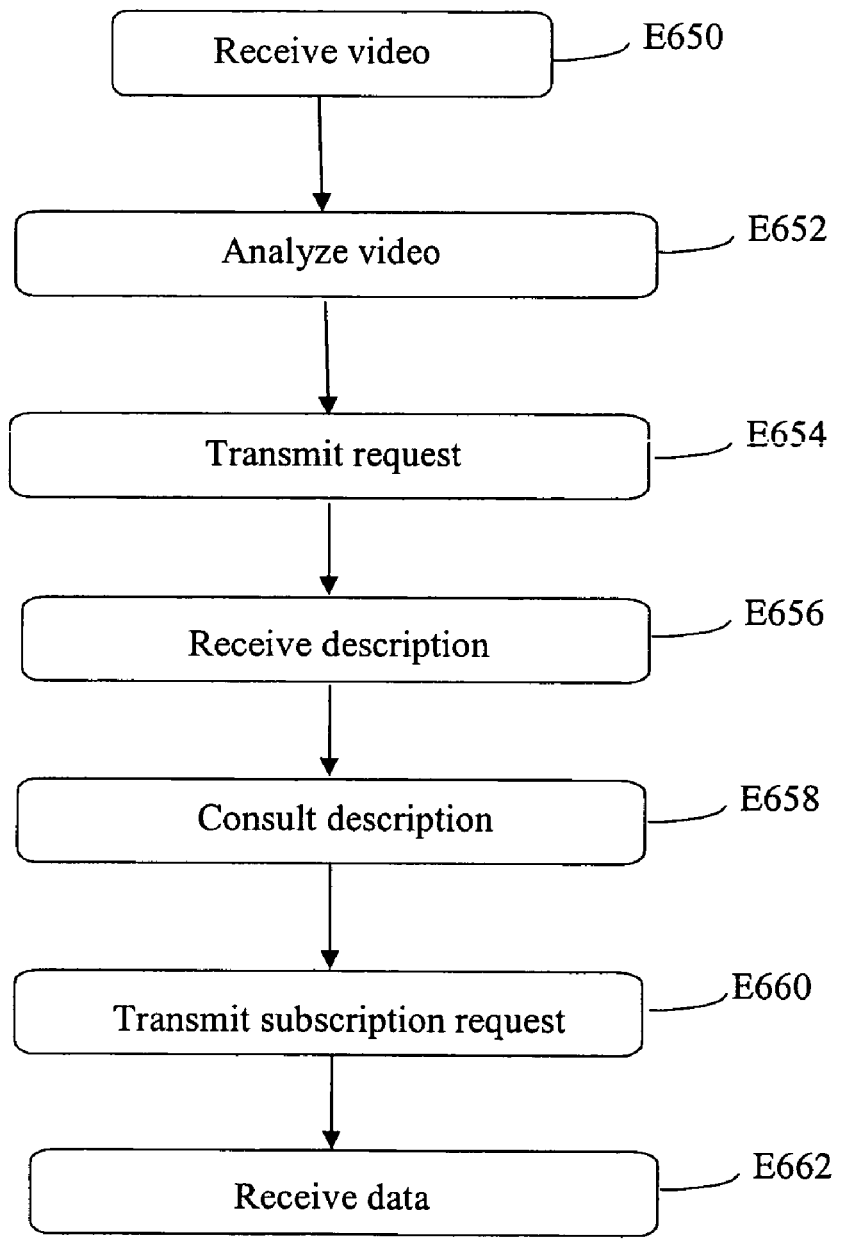
FIG. 5 is an algorithm illustrating the main steps carried out by a client machine.

The algorithm of FIG. 5 schematically shows in summary form the various main steps carried out by each of the client machines 12 to 30 shown in FIG. 1, the mode of operation of which has just been described with reference to FIGS. 2 to 4.

It will be noted that this algorithm does not deal with the case where the client sends a first request before even receiving the video.

This case is assumed to have taken place prior to execution of the algorithm in FIG. 5.

The algorithm in FIG. 5 comprises a first step E650 during which the client machine receives the video broadcast continuously by the server.

During the next step E652, the video is analyzed in order to create a request specifying a spatial zone of interest, or even a number of zones, in relation to an image or a plurality of images of the video.

During the next step E654, the request thus formed is transmitted to the server.

The server receives the requests and processes them as has been seen above starting from step E403 of FIG. 2 up to generation and transmission of the content descriptions for the multipoint network sessions created previously by the server.

The description transmitted in step E407 by the server is received by the client machine in question in step E656.

In step E658, the client machine then consults the description received so as to determine whether the content of the session or sessions proposed to it meets its initial request.

If so, step E658 is followed by a step E660, during which the client machine transmits to the server a request to subscribe to at least some of the multipoint network sessions created by the server.

In the next step E662, the client machine in question thus receives the data specified in its initial request.

It should be noted that the image data that meet the initial request of a client machine come from one or more multipoint network sessions created by the server for the intersection or intersections determined between the various spatial zones of interest requested in all the requests processed by the server.

All the data which are specific to the spatial zone or zones of interest requested by the client machine in question and which are not contained in the aforementioned intersections are obtained by one or more multipoint or point-to-point network sessions created previously by the server.

If one of the users would like just one zone of an image, it is not necessary for the entire image to be transmitted to him, thus avoiding wasting the bandwidth available on the network.

It will be noted that the invention is particularly beneficial when a number of users are requesting the same video at the same time.

It will be noted that the invention applies even if two users are requesting two distinct spatial zones of interest when these two zones do not themselves make it possible for the image to be reconstituted, or else if they are requesting two spatial zones of interest having one or more common parts (intersections).

Moreover, the invention makes it possible to meet all the requests made by the client machines.

It will be noted that each client is responsible for regulating its own rate, and this relieves the server of this task.

By virtue of the invention, the server rationalizes the responses to the requests made by the client machines and thus reduces the amounts of data transmitted over the network, which makes it possible to better adapt to the bandwidth available on the network and also not to disadvantageously overload the latter.

An intelligent server organizes as best as possible the processing of all the requests received from the various client machines, thus making it possible to reduce the number of open sessions with respect to all of the requests received.

Note that when a client wishes to end its video session, he must inform the server of this and, to do so, he sends a JPIP request containing the field channel close along with the session identifier.

As soon as this request is received, the server stops the session and carries out the process of FIG. 2 starting from step E406.

In one embodiment, the methods of encoding the video in the MJPEG2000 format, of processing the requests (in particular of retrieving the requests and searching for the common parts between the spatial zones of interest of the various requests) and of transmitting the data in accordance with the organization of the responses according to the invention are carried out in the form of computer programs.

The same is true in respect of the steps of the method shown in FIG. 5.

These programs comprise one or more sequences of instructions, execution of which by a computer, or, more generally, by a programmable communication apparatus acting as server 10 (FIG. 1), makes it possible for the steps of said methods to be carried out according to the invention.

In general, an information storage means which can be read by a computer or by a microprocessor, integrated in said computer or not, and which may possibly be removable is suitable for storing a program capable of implementing these methods according to the invention.

Figure 6:
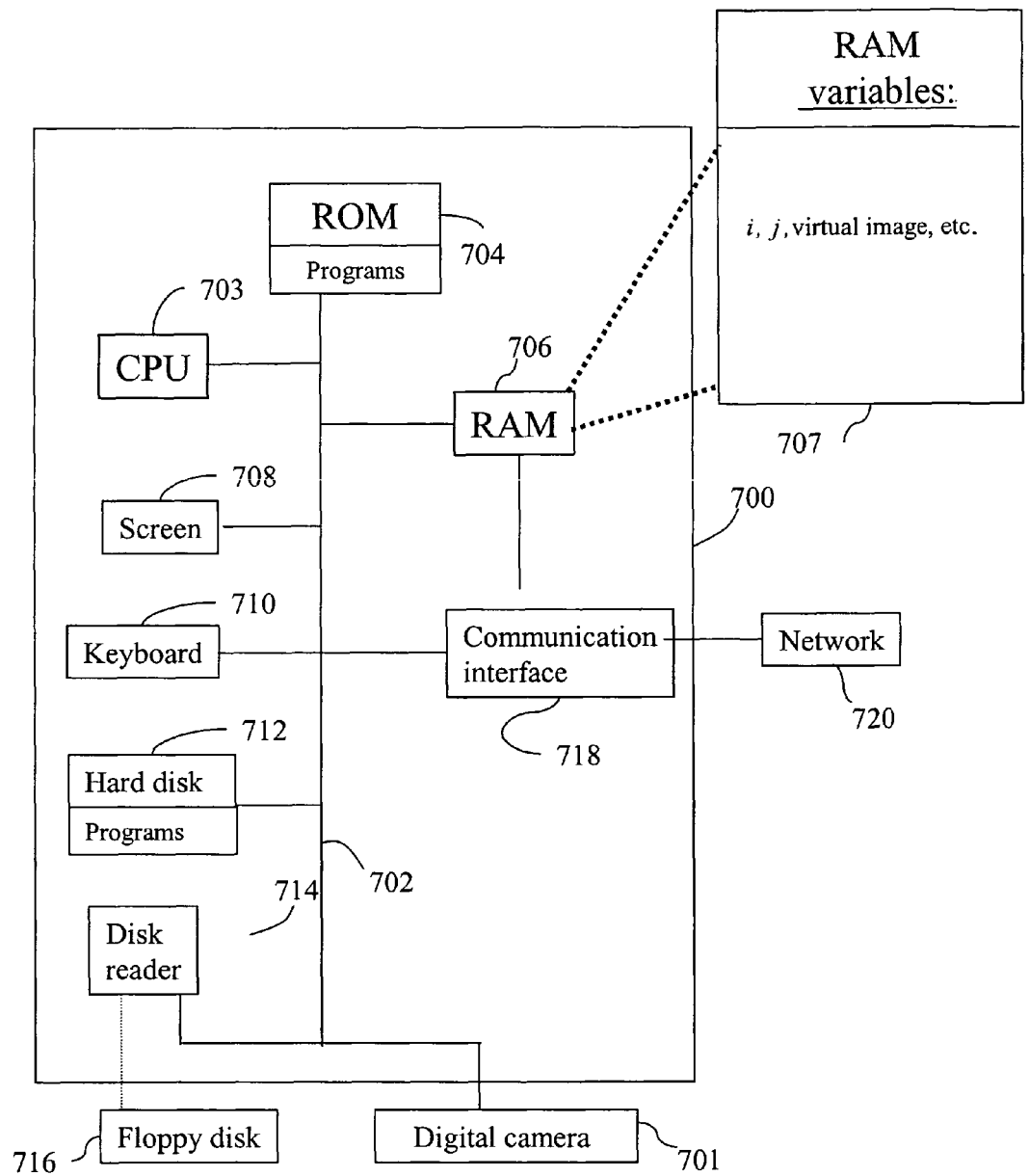
FIG. 6 is a schematic view of a communication apparatus according to the invention.

In FIG. 6, the computer 700, which may be a microcomputer or a workstation, is connected to various peripherals, for example a digital camera 701 for recording video or any other device for taking or storing images, such as a scanner, providing the computer with videos to be transmitted. These videos may be stored in the storage means of the computer.

The computer 700 also has a communication interface 718 which is connected to a communication network 720, for example the Internet, and which is able to transmit and receive digital information.

The computer 700 also comprises means for storing data, such as a hard disk 712, a floppy disk reader 714 making it possible to write data to a floppy disk 716 and read these data. The computer may also comprise a reader of compact disks (CDROM) or (DVDROM), not shown, on which the videos may be stored, and also a PC-CARD reader, not shown.

The executable codes of the program or programs making it possible to implement the various parts of the invention are stored, for example, on the hard disk 712.

According to one variant embodiment, the executable codes of these programs are stored in a ROM memory ("Read Only Memory") 704 of the computer.

The computer 700 also comprises a screen 708 for displaying the videos and a pointer device (not shown), such as a mouse or light-pen, and/or a keyboard 710 so as to be able to interact with the program.

The computer comprises a central processing unit (CPU) 703, for example a microprocessor, which controls and manages the execution of the instructions of the program or programs of the invention stored in the ROM memory 704 or on the hard disk 712.

The computer 700 also comprises a RAM memory ("Random Access Memory") 707. As can be seen in the enlarged diagram of the RAM memory 707, the latter comprises registers for storing the variables created and modified during the execution of the program or programs according to the invention, in particular the variables mentioned above in the text with reference to FIGS. 3 and 4.

The programmable communication apparatus 700 (server) comprises all the means necessary to implement the invention so as to encode the data, transmit a video, receive the requests, process them, and transmit a content description for the sessions created as well as the data for the zones specified in the requests or enlarged zones.

The structure of the client machines is identical to that of FIG. 6, but the functions performed are different: reception and analysis of the videos, creation and transmission of initial requests, consultation of the description or descriptions received, generation and transmission of subscription requests and reception of data that meet the initial requests. These functions also include, in particular, the encoding and decoding of data, the displaying of the videos and the use of a graphic interface which makes it possible to change the display quality.

The invention claimed is:

1. A method executed by a server for the continuous transmission of one video from the server to a number of client machines over a communication network, the video being constituted of successive images of pixel data, the pixels of each image being encoded in the form of a set of digital data according to an encoding method allowing at least a random access to any spatial zone of pixel data of interest inside the image of pixel data of said video without requiring any decoding and re-encoding process, comprising:

obtaining a request from the client machine, said request specifying at least one spatial zone of pixel data of interest inside one or more of the successive images of pixel data of the video, wherein each spatial zone of pixel data of interest is a partial area of a total area of the corresponding image of pixel data and corresponds to a subset of the set of digital data corresponding to the image of pixel data;

determining a current spatial zone of interest covered by said request;

comparing said current spatial zone of interest with other spatial zones of interest coming from preceding requests so as to determine at least one two dimensional intersection of pixel data in the specified spatial zones of pixel data of interest of the video;

for each determined two dimensional intersection of pixel data in each image of pixel data of the one or more successive images of pixel data, determining a corresponding subset of digital data in the set of digital data corresponding to the image of pixel data, the determined subset of digital data corresponding to digital data of the image requested by a plurality of client machines;

extracting from the set of digital data of the one or more images of pixel data, the subset of digital data corresponding to the determined two dimensional intersection of pixel data; and creating a multipoint network session to which the plurality of client machines for which said request specifies the spatial zone containing said two dimensional intersection of pixel data may subscribe, and transmitting the subset of digital data corresponding to said two dimensional intersection of pixel data in said multipoint session.

2. The method according to claim 1, further comprising a step of point-to-point transmission over the network, from the server, of a description of the content of each multipoint network session designed to inform each client machine.

3. The method according to claim 2, further comprising a step of obtaining a request to subscribe one of the client machines to a subset or to the entire set of the multipoint sessions created by the server, this subset or entire set being designed to transport the data that meets the initial request from the client machine, said subscription request being transmitted by said client machine after the latter has consulted the description of the content of at least one multipoint network session.

4. The method according to claim 3, further comprising a step of transmitting to the client machine in question data transported by the subset or entire set of multipoint network sessions.

5. The method according to claim 1, further comprising a step of creating at least one multipoint or point-to-point network session for data specified in at least one request from a client machine which is not contained in the determined intersections.

6. The method according to claim 5, further comprising a step of transmitting data specified in at least one request from a client machine which is not contained in the determined intersections to each client machine which request specifies said data.

7. A device for the continuous transmission of one video from a server to a number of client machines over a communication network, the video being constituted of successive images of pixel data, the pixels of each image being encoded in the form of a set of digital data according to an encoding method allowing at least a random access to any spatial zone of pixel data of interest inside the image of pixel data of said video without requiring any decoding and re-encoding process, comprising:

at least one processor; and a memory storing code of computer program that, when executed by the processor, causes the device to perform:

obtaining a of request from the client machine, said request specifying at least one spatial zone of pixel data of interest inside one or more of the successive images of pixel data of the video, wherein each spatial zone of pixel data of interest is a partial area of a total area of the corresponding image of pixel data and corresponds to a subset of the set of digital data corresponding to the image of pixel data;

determining a current spatial zone of interest covered by said request;

comparing said current spatial zone of interest with other spatial zones of interest coming from preceding requests so as to determine at least one two dimensional intersection of pixel data in the specified spatial zones of pixel data of interest of the video;

for each determined two dimensional intersection of pixel data in each image of pixel data of the one or more successive images of pixel data;

determining a corresponding subset of digital data in the set of digital data corresponding to the image of pixel data, the determined subset of digital data corresponding to digital data of the image requested by a plurality of client machines;

extracting from the set of digital data of the one or more images of pixel data, the subset of digital data corresponding to the determined two dimensional intersection of pixel data; and creating a multipoint network session to which the plurality of client machines for which request specifies the spatial zone containing said two dimensional intersection of pixel data may subscribe, and transmitting the subset of digital data corresponding to said two dimensional intersection of pixel data in said multipoint session.

8. The device according to claim 7, further comprising transmitting the point-to-point transmission over the network, from the server, of a description of the content of each multipoint network session designed to inform each client machine.

9. The device according to claim 7, wherein the multipoint network session comprises a multipoint address in the network.

10. The device according to claim 9, wherein the multipoint address corresponds to the address of a multipoint router of the network.

11. The device according to claim 8, further comprising obtaining a request to subscribe one of the client machines to a subset or to the entire set of the multipoint sessions created by the server, this subset or entire set being designed to transport the data that meets the initial request from the client machine.

12. The device according to claim 11, further comprising transmitting to the client machine in question data transported by the subset or entire set of multipoint network sessions.

13. The device according to claim 7, further comprising creating at least one multipoint or point-to-point network session for data specified in at least one request from a client machine which is not contained in the determined intersections.

14. The device according to claim 13, further comprising transmitting data specified in at least one request from a client machine which is not contained in the determined intersections to each client machine for which the request specifies said data.

15. A communication apparatus comprising the device according to claim 7.

16. A non-transitory computer readable storage medium which can be read by a computer or microprocessor, comprising code instructions for a computer program for executing the steps of the method according to claim 1.

17. The method according to claim 1, wherein each image is encoded in the form of a set of digital data according to an encoding method allowing at least a random access to any resolution.

18. The method according to claim 1, wherein each image is encoded in the form of a set of digital data according to an encoding method allowing at least a random access to any quality level.

19. The method according to claim 1, wherein each image is encoded in the form of a set of digital data according to an encoding method allowing at least a random access to any temporal level.

* * * * *